(12) United States Patent
Astrov et al.

(10) Patent No.: US 8,041,567 B2
(45) Date of Patent: Oct. 18, 2011

(54) METHOD OF SPEAKER ADAPTATION FOR A HIDDEN MARKOV MODEL BASED VOICE RECOGNITION SYSTEM

(75) Inventors: Sergey Astrov, Munich (DE); Josef Bauer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1187 days.

(21) Appl. No.: 11/231,940

(22) Filed: Sep. 22, 2005

(65) Prior Publication Data

US 2006/0074665 A1 Apr. 6, 2006

(30) Foreign Application Priority Data

Sep. 22, 2004 (DE) .................. 10 2004 045 979

(51) Int. Cl.
*G10L 15/14* (2006.01)
(52) U.S. Cl. .................. 704/256.1; 704/256.5
(58) Field of Classification Search ........... 704/256.1, 704/256.5
See application file for complete search history.

(56) References Cited

U.S. PATENT DOCUMENTS 6,711,543 B2 3/2004 Cameron
6,751,590 B1 6/2004 Chaudhari et al.
2004/0230424 A1* 11/2004 Gunawardana ............... 704/219

FOREIGN PATENT DOCUMENTS

DE 42 22 916 6/1993

OTHER PUBLICATIONS

Bub et al, "In-service adaptation of multilingual hidden-markov-models", in Proc. IEEE Int. Conf. on Acoustics, Speech, and Signal Processing (ICASSP), vol. 2, (Munich), pp. 1451-1454, 1997.*
Satoshi Takahashi et al., " Four-Level Tied-Structure for Efficient Representation of Acoustic Modeling" pp. 520-523, Acoustics, Speech and Signal Processing , Conference on Detroit, IEEE, 1995.
M.J.F. Gales "Maximum Likelihood Linear Transformations for HMM-Based Speech Recognition" Techn. Rep. CUEDFINFENG/TR291/ Cambridge University 1997.
U. Bub et al. "In Service Adaptation of Multilingual Hidden-Markov-Models", Proc. IEEE Int. Conf. on Acoustics, Speech and Signal Processing (ICASSP) vol. 2, pp. 1451-1454, 1997 Munich.
Astov "Memory Space Reduction for Hidden Markov Models in Low-Resource Speech Recognition Systems," Proc. Int. Conf. on Spoken Language Processing (CSLP), pp. 1585-1588, 2002.
"Huffman Coding" Wikipedia.org, Jun. 17, 2009; pp. 1-8.
"Adaptive Huffman Coding" Wikipedia.org, Jun. 17, 2009; pp. 1-3.

* cited by examiner

*Primary Examiner* — Angela A Armstrong
(74) *Attorney, Agent, or Firm* — Staas & Halsey LLP

(57) ABSTRACT

Commercially available voice recognition systems are generally speaker-dependent, with the voice recognition system first being trained to the voice of the speaker before it can be used. A disadvantage with this method is that modified reference data has to be buffered and permanently saved in several steps when the speaker adaptation algorithm is executed, and thus requires a lot of memory space. This primarily negatively affects applications on devices with restricted processor power and limited memory space, such as mobile radio terminals for example. A method of speaker adaptation for a Hidden Markov Model based voice recognition system may address these issues. In the method, the memory space requirement and thus also the processor power required can be considerably reduced. This is achieved by using modified reference data in a speaker adaptation algorithm to adapt a new speaker to a reference speaker. The modified reference data is processed in compressed form.

18 Claims, 2 Drawing Sheets

METHOD OF SPEAKER ADAPTATION FOR A HIDDEN MARKOV MODEL BASED VOICE RECOGNITION SYSTEM

CROSS REFERENCE TO RELATED APPLICATIONS

This application is based on and hereby claims priority to German Application No. 10 2004 045 979.7 filed on Sep. 22, 2004, the contents of which are hereby incorporated by reference.

BACKGROUND OF THE INVENTION

The present invention relates to a method of speaker adaptation for a Hidden Markov Model based voice recognition system.

Voice recognition systems can be employed in many fields. For example, possible areas of use are dialog systems that permit purely voice communication between a speaker and an information or booking machine over the telephone. Other areas of application of a voice recognition system are operation of an infotainment system in the car by the driver and control of an operation assistance system by the surgeon if use of a keyboard entails disadvantages. Another important area of use is dictation systems, which enable texts to be written faster and more easily.

It is incomparably harder to recognize the voice of a random speaker than to recognize a known speaker. This is because of the wide variations in how different people speak. For this reason there are speaker-dependent and non-speaker-dependent voice recognition systems. Speaker-dependent voice recognition systems can only be used by a speaker known to the system, but for this speaker achieve a particularly high level of recognition. Non-speaker-dependent voice recognition systems can be used by any speaker, but the level of recognition lags way behind that of a speaker-dependent voice recognition system. In many applications, speaker-dependent voice recognition systems cannot be used, as for example in the case of telephone information and booking systems. However, if only a restricted group of people uses a voice recognition system, as for example in the case of a dictation system, a speaker-dependent voice recognition system is frequently used.

Commercially available voice recognition systems are generally speaker-dependent, with the voice recognition system first being trained to the voice of the speaker before it can be used.

In practice two methods are frequently used for speaker adaptation. In a first method of vocal tract length normalization (VTLN) the frequency axis of the voice spectrum is stretched or compressed linearly in order to align the spectrum to that of a reference speaker.

In a second method the voice signal remains unaltered. Instead, acoustic models of the voice recognition system, mostly in the form of reference data of a reference speaker, are adapted to the new speaker using a linear transformation. This method has more free parameters and hence is more flexible than vocal tract length normalization.

A disadvantage of the second method is that the modified reference data has to be buffered and permanently saved in several steps when the voice adaptation algorithm is executed. This requires a lot of memory space, which primarily negatively affects applications on devices with restricted processor power and limited memory space, such as mobile radio terminals for example.

SUMMARY OF THE INVENTION

One potential object of the present invention is to specify a method for speaker adaptation for a Hidden Markov Model based voice recognition system, with which the requirement for memory space and thus also the processing power needed can be reduced considerably.

The inventors propose a method of speaker adaptation for a Hidden Markov Model based voice recognition system, modified reference data which is used in a speaker adaptation algorithm to adapt a new speaker to a reference speaker is processed in compressed form.

According to an advantageous development the speaker adaptation algorithm is executed as a combination of a Maximum Likelihood Linear Regression (MLLR) algorithm and of a Heuristic Incremental Adaptation algorithm. This has the advantage firstly that a fast reduction in the average error rate is achieved by the MLLR algorithm after a few adaptation words and secondly a continuous reduction in the average error rate is achieved by the HIA algorithm as the number of adaptation words increases.

According to a further advantageous development of the present invention individual components of a modified reference data element are combined and are replaced by an entry in a static codebook table. In this way easy-to-implement and effective compression of the modified reference data can be achieved.

When the control program, stored on a non-transitory computer readable medium, is executed the program execution control device processes in compressed form modified reference data which is used in a speaker adaptation algorithm to adapt a new speaker to a reference speaker.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
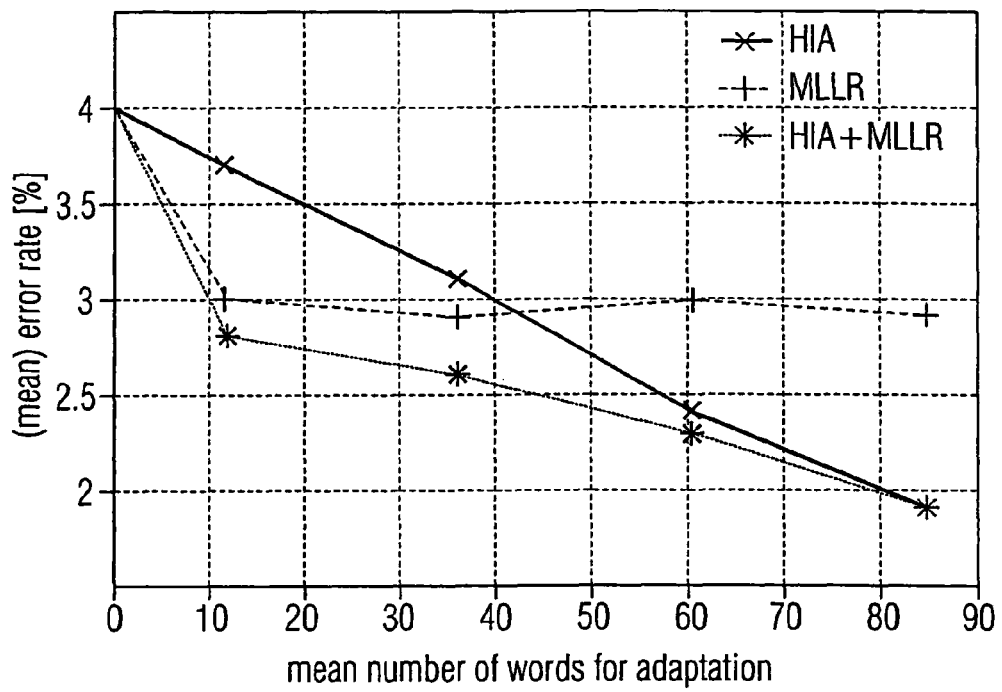
FIG. 1 shows a diagram with the results of various speaker adaptation algorithms without compression.

Reference will now be made in detail to the preferred embodiments of the present invention, examples of which are illustrated in the accompanying drawings, wherein like reference numerals refer to like elements throughout.

In the present exemplary embodiment, a speaker adaptation for a voice recognition system may be implemented on the basis of a combination of two different speaker adaptation algorithms. A first algorithm is the Maximum Likelihood Linear Regression (MLLR) algorithm, which is described in M. Gales, "Maximum likelihood linear transformations for HMM-based speech recognition", tech.rep., CUED/FIN-FENG/TR291, Cambridge Univ., 1997. This algorithm ensures fast and global speaker adaptation, but is not suitable for processing a large volume of training data. A second algorithm is the Heuristic Incremental Adaptation (HIA) algorithm, which is described in U. Bub, J. Köhler, and B.

Imperl, "In-service adaptation of multilingual hidden-markov-models", in *Proc. IEEE Int. Conf. On Acoustics, Speech, and Signal Processing (ICASSP)*, vol. 2, (Munich), pp. 1451-1454, 1997. A detailed speaker adaptation is thereby achieved using a large volume of training data. Hence it is expedient to combine the two algorithms.

The first algorithm MLLR requires 4 vector multiplications to be calculated for an algorithm iteration. A vector generally has the dimension 24 here and each vector element is encoded with 4 bytes. Thus for each algorithm, an iteration memory space of 4×24×4 bytes=384 bytes is needed during voice adaptation.

The second algorithm HIA generally requires 1200 vectors with the dimension 24 for an algorithm iteration, each vector element being encoded with 1 byte. This results in a memory space requirement of 1200×24×1 byte=28.8 kbytes.

FIG. 1 shows the results of the various voice adaptation algorithms MLLR, HIA and MLLR+HIA without memory-space-reducing compression. The abscissa axis lists the average number of words needed for the adaptation and the ordinate axis lists the average error rate for recognition performance as a percentage. It is seen that the MLLR algorithm results in a very fast speaker adaptation. After 10 adaptation words a maximum error rate of around 30% is achieved. The HIA algorithm converges very much more slowly. However, it more effectively uses a larger number of words for the adaptation, resulting in a reduction of the average error rate to around 19% for 85 adaptation words. The combination of MLLR and HIA algorithms combines the positive characteristics of both algorithms. Firstly a fast reduction in the average error rate is achieved after a few adaptation words, and secondly, there is a continuous reduction in the average error rate as the number of adaptation words increases.

A memory-space-reducing compression is now undertaken for the HIA algorithm. To this end 3 consecutive vector elements of a vector are combined to form a vector component. In a codebook with 256 vectors, each of which has 3 elements, the entry with the smallest Euclidian distance to the vector component is sought. The vector component is replaced by the corresponding index entry from the codebook which requires 1 byte of memory space. This memory-space-reducing compression now results in a memory space requirement of 1200×8×1 byte=9600 bytes for an algorithm iteration. The memory space consumption is thus reduced by a factor of 3 versus the HIA algorithm. A full description of the compression procedure undertaken can be found in S. Astrov, "Memory space reduction for hidden markov models in low-resource speech recognition systems", in *Proc. Int. Conf. on Spoken Language Processing (ICSLP)*, pp. 1585-1588, 2002.

In the HIA method, compression may be done only to the final results after execution of the algorithm. Alternatively, compression may be done for the final results and after each algorithm iteration to the interim results of the algorithm.

Figure 2:
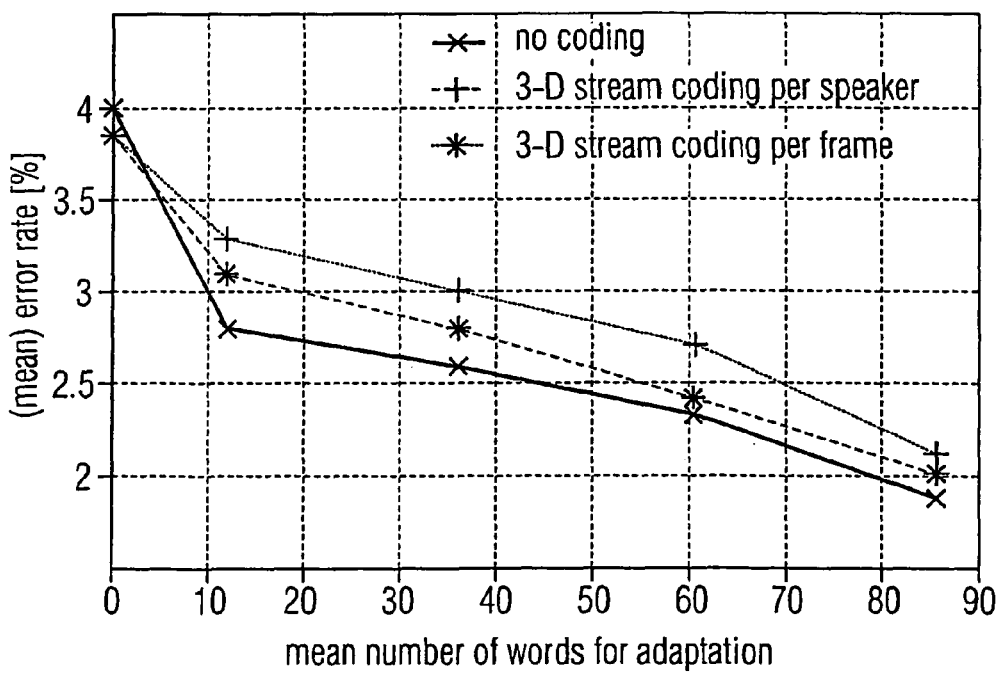
FIG. 2 shows a diagram with the results of the combined MLLR and HIA speaker adaptation algorithm with and without compression.
Figure 3:
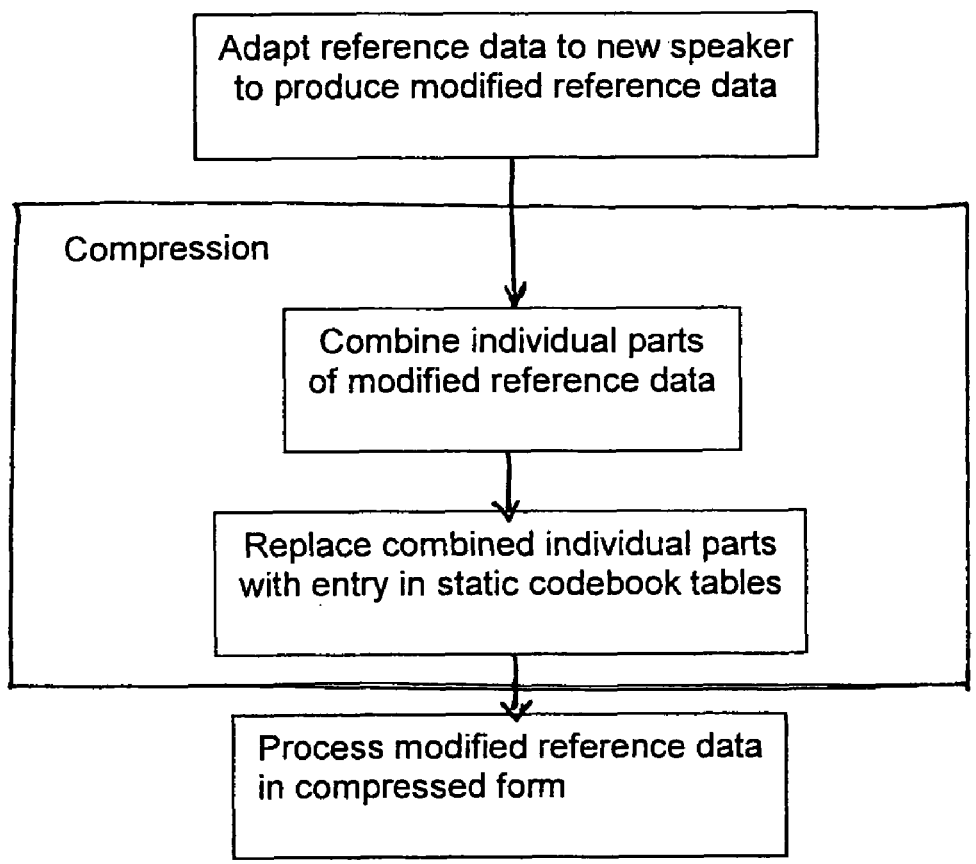
FIG. 3 shows a diagram representing the method proposed by the inventors.

FIG. 2 shows the results of the combined MLLR+HIA algorithm with and without memory-space-reducing compression. The abscissa axis lists the average number of words used for the adaptation and the ordinate axis lists the average error rate for recognition performance as a percentage. It is seen that the results of the compressed speaker adaptation algorithms have an average error rate some 10% higher. The speaker adaptation algorithm with compression of the interim and final results ("3d stream coding per frame") results in a lower average error rate and thus a better voice recognition performance than the speaker adaptation algorithm with compression of only the final results ("3d stream coding per speaker").

In the exemplary embodiment an MLLR algorithm is used which requires 384 bytes of memory space. By compressing the vectors in the HIA algorithm the memory space consumption is reduced by a factor of 3 from 28.8 kbytes to 9600 bytes. In contrast the average error rate is increased and thus recognition performance deteriorates by some 10% compared to using an HIA algorithm without compression. However, this seems acceptable in view of the reduction achieved in memory space consumption and the associated lower processor power required.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

What is claimed is:

1. A method of speaker adaptation for a Hidden Markov Model based voice recognition system that uses reference data to represent acoustic models of speech recognition and compresses the reference data using codebook tables, comprising:
adapting the reference data to a new speaker to obtain modified reference data;
compressing the modified reference data by:
combining individual parts of the modified reference data to produce combined individual parts; and
replacing the combined individual parts with an entry in the codebook tables;
processing the modified reference data in compressed form, wherein the codebook tables are static; and
performing voice recognition using the modified reference data in compressed form.

2. The method according to claim 1, wherein the modified reference data is compressed by a lossy compression procedure.

3. The method according to claim 1, wherein the modified reference data is saved in compressed form after the individual parts of the modified reference data are combined and after the combined individual parts are replaced with the entry in the codebook tables.

4. The method according to claim 1, wherein the modified reference data is buffered and permanently saved in compressed form while the individual parts of the modified reference data are combined and while the combined individual parts are replaced with the entry in the codebook tables.

5. The method according to claim 1, wherein combining individual parts of the modified reference data and replacing the combined individual parts are performed using a Maximum Likelihood Linear Regression algorithm.

6. The method according to claim 1, wherein combining individual parts of the modified reference data and replacing the combined individual parts are performed using a Heuristic Incremental Adaptation algorithm.

7. The method according to claim 1, wherein combining individual parts of the modified reference data and replacing the combined individual parts are performed using a Maximum Likelihood Linear Regression algorithm and a Heuristic Incremental Adaptation algorithm.

8. The method according to claim 1, wherein combining individual parts of the modified reference data and replacing the combined individual parts are performed using a Maximum A-Posteriori algorithm.

9. The method according to claim 1, wherein the modified reference data is compressed by a loss-free compression procedure.

10. The method according to claim 1, wherein the modified reference data is in the form of multidimensional characteristic vectors.

11. The method according to claim 10, wherein the modified reference data is buffered and permanently saved in compressed form while the individual parts of the modified reference data are combined and while the combined individual parts are replaced with the entry in the codebook tables.

12. The method according to claim 11, wherein combining individual parts of the modified reference data and replacing the combined individual parts are performed using a Maximum Likelihood Linear Regression algorithm.

13. The method according to claim 11, wherein combining individual parts of the modified reference data and replacing the combined individual parts are performed using a Heuristic Incremental Adaptation algorithm.

14. The method according to claim 11, wherein combining individual parts of the modified reference data and replacing the combined individual parts are performed using a combination of a Maximum Likelihood Linear Regression algorithm and a Heuristic Incremental Adaptation algorithm.

15. The method according to claim 11, wherein combining individual parts of the modified reference data and replacing the combined individual parts are performed using a Maximum A-Posteriori algorithm.

16. The method according to claim 15, wherein the modified reference data is compressed by a loss-free compression procedure.

17. The method according to claim 15, wherein the modified reference data is compressed by a lossy compression procedure.

18. A non-transitory computer readable medium storing a control program which when executed by a program execution control device performs a method of speaker adaptation for a Hidden Markov Model based voice recognition system that uses reference data to represent acoustic models of speech recognition and compresses the reference data using codebook tables, the method comprising:
  adapting the reference data to a new speaker to obtain modified reference data;
  compressing the modified reference data by:
    combining individual parts of the modified reference data to produce combined individual parts; and
    replacing the combined individual parts with an entry in the codebook tables;
  processing the modified reference data in compressed form, wherein the codebook tables are static; and
  performing voice recognition using the modified reference data in compressed form.

* * * * *